Figure 1:
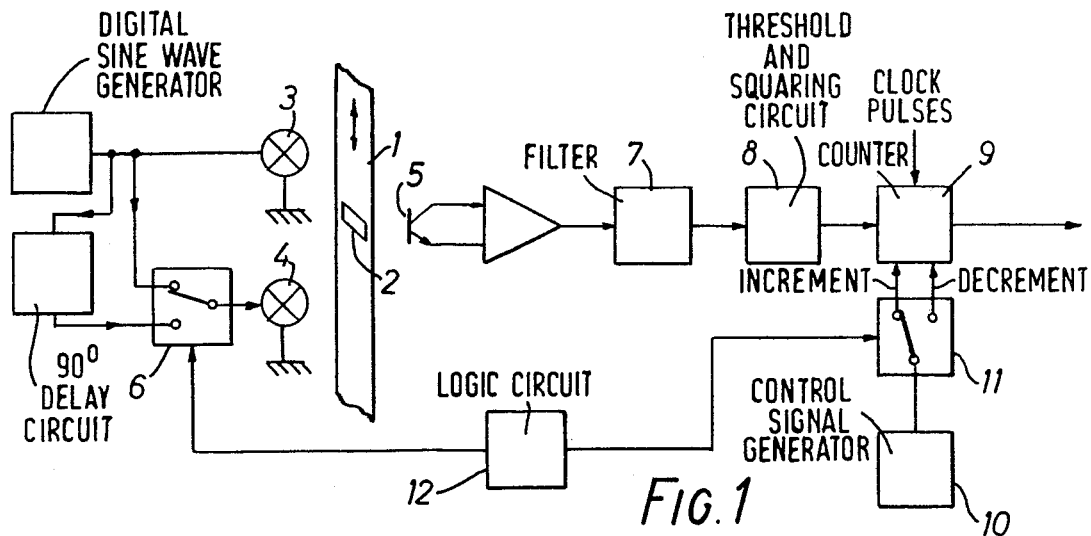

United States Patent [19]
Fowler

[11] 3,942,002
[45] Mar. 2, 1976

[54] SIGNAL COMBINING CIRCUITS

[75] Inventor: Albert Lewis Fowler, Kirkcaldy, Scotland

[73] Assignee: Hughes Microelectronics Limited, Culver City, Calif.

[22] Filed: July 11, 1974

[21] Appl. No.: 487,635

[30] Foreign Application Priority Data
July 12, 1973  United Kingdom............... 33169/73

[52] U.S. Cl............. 250/231 R; 250/204; 250/209; 250/237 R; 307/311
[51] Int. Cl.².......................................... G01D 5/34
[58] Field of Search........... 73/398 R; 250/204, 205, 250/209, 210, 214, 231 R, 231 SE, 237 R, 237 G, 199; 307/311

[56] References Cited
UNITED STATES PATENTS

| | | | |
|---|---|---|---|
| 3,309,525 | 3/1967 | Johnson | 250/231 SE |
| 3,381,212 | 4/1968 | Peltola | 307/311 |
| 3,492,488 | 1/1970 | Goettelman | 250/214 R |
| 3,524,986 | 8/1970 | Harnden | 250/214 R |
| 3,622,801 | 11/1971 | Stone | 307/311 |
| 3,783,277 | 1/1974 | Younkin et al. | 250/209 |

*Primary Examiner*—Alfred E. Smith
*Assistant Examiner*—D. C. Nelms
*Attorney, Agent, or Firm*—W. H. MacAllister; Lawrence V. Link, Jr.

[57] ABSTRACT

A signal combining circuit includes means for receiving a pair of digital waveforms of similar frequency and for producing a further waveform which is indicative by its phase of the relative amplitudes of the waveforms. A circuit arrangement is provided for reducing undesirable distortions of the shape of the further waveform, however this arrangement introduces undesirable phase modifications and means are provided for reducing the effect of these modifications. The relative phases of the two digital waveforms are, at a predetermined frequency, switched to one or other of two predetermined relationships and the phase of the further waveform obtained when one of the relationships occurs is compared with that obtained when the other relationship occurs in order to compensate for said modifications.

11 Claims, 12 Drawing Figures

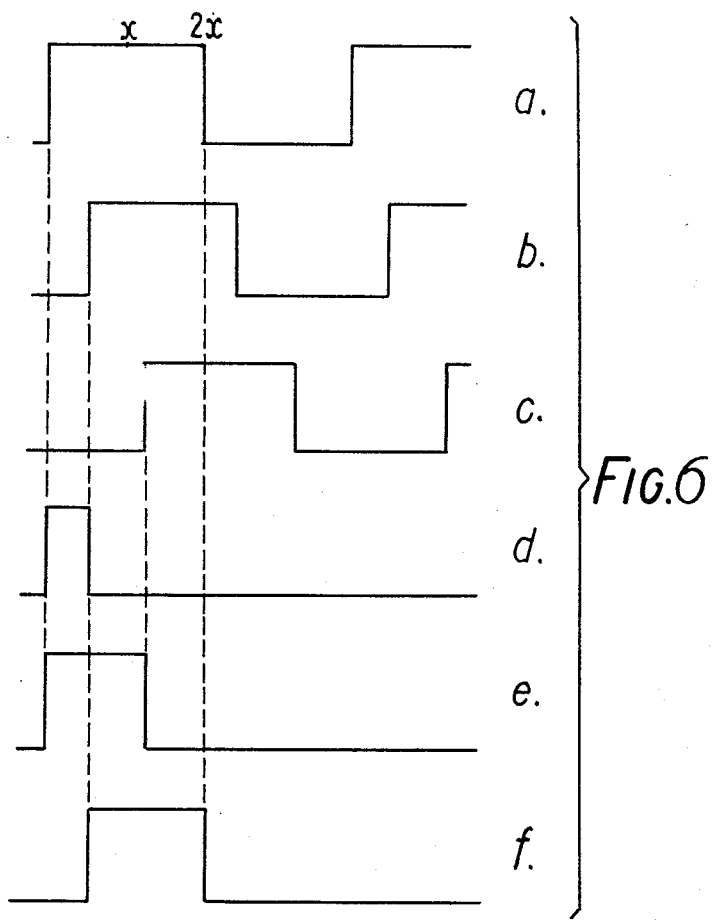
FIG. 6
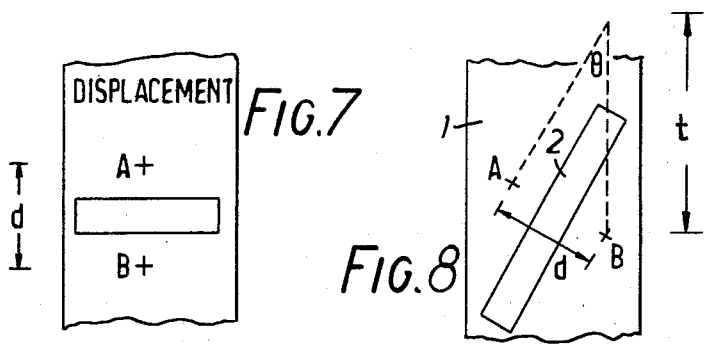
FIG. 7
FIG. 8

SIGNAL COMBINING CIRCUITS

The present invention relates to signal combining circuits and it relates in particular to the compensation of phase errors introduced by such circuits.

The invention is especially, though not exclusively, applicable to circuits for combining two waveforms of sinusoidal nature, so as to provide an indication of the motion of a member which is capable of varying the relative amplitudes of said waveforms. Such circuits are used in transducers for converting a mechanical motion into an electrical signal the phase of which is indicative of said motion.

According to the invention there is provided a signal combining circuit including first and second devices excitable by periodically varying waveforms of substantially the same frequency to radiate energy of the said frequency, sensing means responsive to said energy for receiving said energy in respectively variable proportions from said devices in accordance with the disposition of a member which is movable relative to said devices and for producing an electrical output signal indicative by its phase of the relative proportions of said energy as sensed by the sensing means, processing means for processing said output signal to reduce distortion thereof, and means for compensating for phase lags impaired to said signal by said processing means, comprising control means for causing the waveforms applied to the first and second devices to assume first and second phase relationships with respect to each other during successive periods of a control waveform of frequency lower than that of said periodically varying waveforms, a counter responsive to said output signal to provide a count indicative of the phase thereof, and means for causing said counter to increment and decrement the count held therein respectively in successive periods of said control waveform.

Figure 2A:
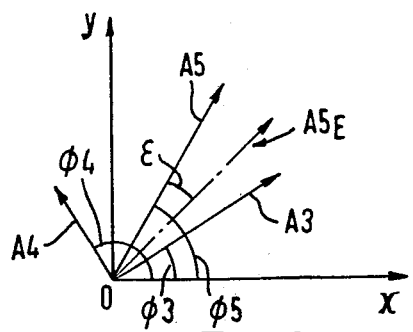
Figure 2B:
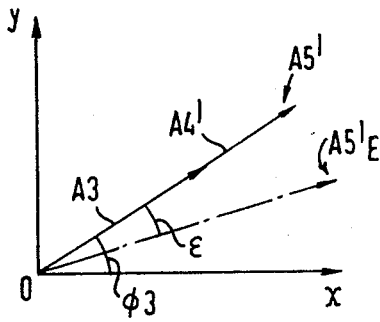
Figure 3A:
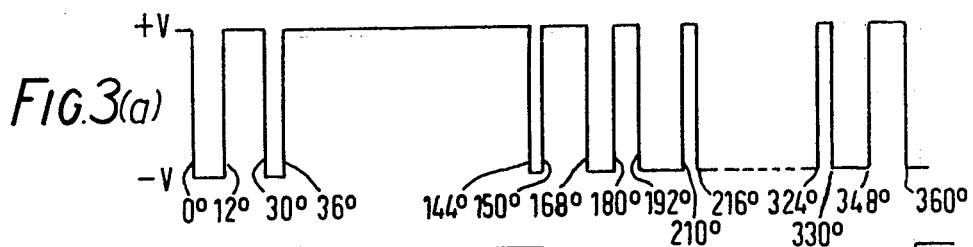
Figure 3B:
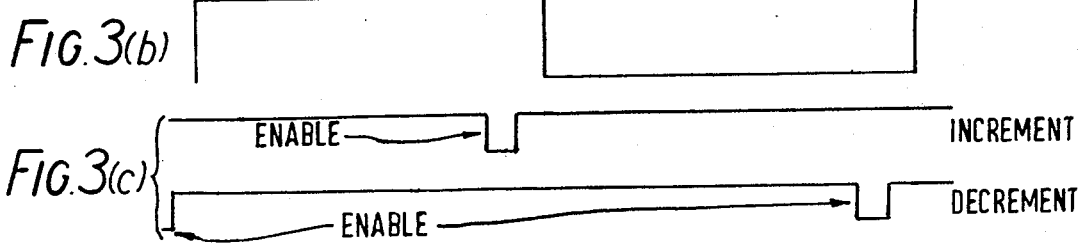
Figure 3C:
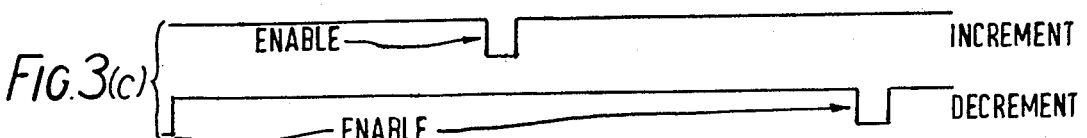
Figure 4A:
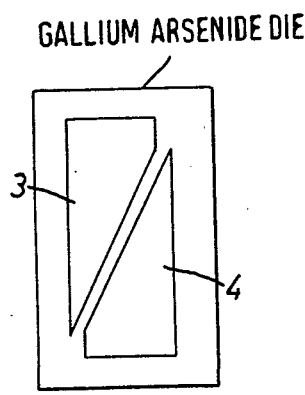
Figure 4B:
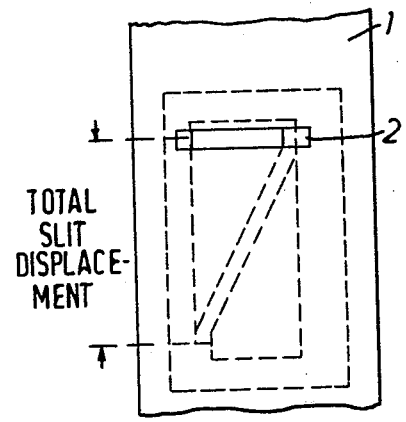
Figure 5:
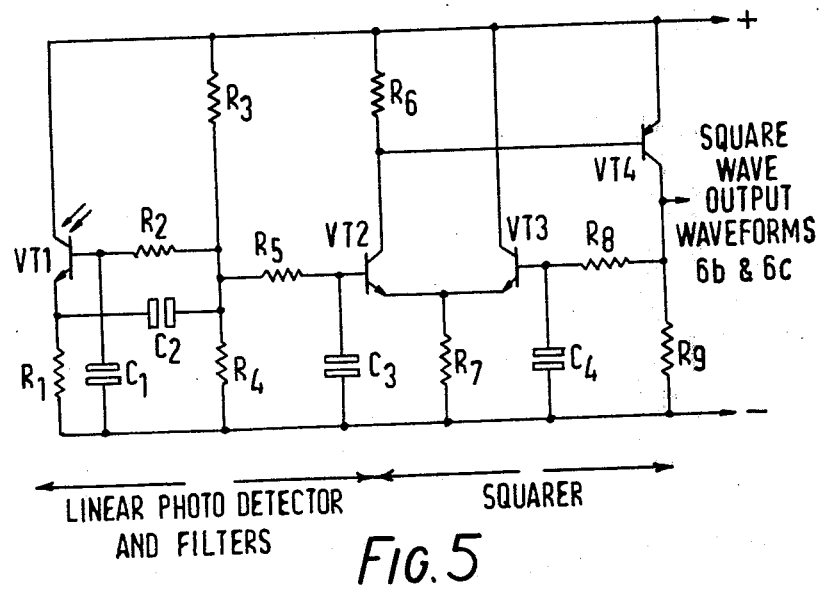

In order that the invention may be clearly understood and readily carried into effect, one embodiment thereof will now be described with reference to the accompanying drawings of which:

FIG. 1 shows, in block diagrammatic form, a signal combining circuit in accordance with one example of the invention, FIGS. 2a and 2b are vector diagrams which will be used in explaining the principle of operation of the circuit shown in FIG. 1, FIGS. 3a, 3b and 3c are waveform diagrams which will be used in explaining the actual operation of the circuit shown in FIG. 1; the horizontal scale in FIGS. 3b and 3c being substantially different from that used in FIG. 3a, FIG. 4a shows a typical arrangement for an integrated lamp assembly, FIG. 4b shows the working range of a slitted member with respect to the lamp member, FIG. 5 shows a detached circuit arrangement which can be used as part of the arrangement shown in FIG. 1, FIGS. 6a to 6f are waveforms explanatory of an alternative mode of operation of the invention, and FIGS. 7 and 8 show how the slit can be angled to increase the working thereof.

The circuit to be described with reference to FIG. 1 comprises the electrical combining circuit of a digital displacement transducer used in providing an electrical indication of the mechanical motion of a member which is arranged to move in accordance with the level of vacuum obtaining in the inlet manifold of an internal combustion engine fitted to an automobile. The invention can therefore be used in conjunction with the automobile ignition system The scope of the invention, however, is not limited to this embodiment, and the following description is provided by way of example only.

Referring now to FIG. 1, a moveable member 1 is secured to a diaphragm or the like (not shown) which can move in accordance with the levels of vacuum obtaining in the inlet nanifold of an internal combustion engine fitted to an automobile. The member 1 is opaque and is provided with a slit 2 via which light from two sources 3 and 4 can be incident upon a photo detector 5. The source 3 is fed with a digital waveform of sinusoidal nature as will be described in more detail hereinafter, whilst the source 4 is supplied via en electronic switch 6 with either said digital waveform of sinusoidal nature or a digital waveform of the same frequency and of co-sinusoidal nature. It will be evident that the position of the slit 2 — as determined by the position of member 1 — will determine the relative amounts of light from the two sources which can be incident upon the detector 5.

Output electrical signals from the detector 5 thus represent a combination of the two light inputs, the phase of the output signals representing the relative amplitudes of the two light inputs. The output signals are amplified linearly and shaped to provide a square waveform and the square waveform is passed through a harmonic filter 7 to tend to reduce contamination thereof by harmonics of the frequency of said digital waveforms. The filtering, however, introduces substantial phase lags into said waveform and also degrades the squareness thereof. The output waveform from the filter 7 is passed to a threshold detector and squaring circuit 8 so that a clean square waveform is applied to a bi-directional counting circuit 9 only when the waveform is in excess of a threshold level set in circuit 8, thus reducing the effects of noise in the circuit.

The counting circuit 9 is arranged to count electrical pulses generated by a clock circuit (not shown), and a control signal applied thereto from a circuit 10 via a second electronic switch 11 determines whether the count is incrementing or decrementing in nature. The switch 11 and the switch 6 are both operated under the control of a logic circuit 12.

Having thus explained the physical interconnections of the circuit and before embarking upon a detailed description of the operation thereof, a brief outline of the principle of operation will now be provided, with reference to FIGS. 2a and 2b.

FIG. 2a shows, with reference to a set of rectangular axes Ox and Oy, vector indications of various signals present in the circuit of FIG. 1. The length of vector A3 represents the amplitude of the light from source 3 which falls on the detector 5 in a given postion of the slit 2. The angle $\phi 3$ represents the phase of the vector A3 relative to the axis Ox. Similarly, the length of the vector A4 and the angle $\phi 4$ represent respectively the amplitude of the light from source 4 which is incident upon the detector 5 in said given position of the slit 2, and the phase of the vector A4 relative to the axis Ox. The vector summation of A3 and A4 is effectively achieved by the detector 5 and the resultant vector A5 has a phase angle $\phi 5$ relative to the axis Ox. Provided that the amplitude of the vector A5 is sufficient, after amplification and filtering, to exceed the threshold set in circuit 8 this parameter is of no more significance. The phase angle $\phi 5$, however, embodies the required output information since it is indicative of the relative amounts of light from source 3 and source 4 respectively incident upon the detector 5, and thus, of course, it is indicative of the position of slit 2 and therefore the displacement of member 1. The following circuits, however, particularly the harmonic filter 7, tend to introduce substantial phase lags and thus the phase of the vector A5 could be retarded by angle $\epsilon$ which can be as much as 50° in some circumstances.

FIG. 2b shows a second vector diagram, in which the vectors A3 and A4 share the same phase $\phi 3$ with respect to the axis Ox. The combined vector A5' should, therefore, also have the phase angle $\phi 3$ but because of the aforementioned phase errors, it will have a phase angle of $\phi 3 - \epsilon$ relative to Ox. In this case, however, because A3 and A4 are in phase, it is known that A5' should share the same phase, thus any deviation of A5' from this phase can be measured and used to correct the value of A5 derived in the conditions of FIG. 2a — i.e. when A3 and A4 are not in phase. In practice it is usual, in the conditions of FIG. 2a, for $\phi 3$ and $\phi 4$ to differ by 90°.

Returning now to the actual operation of the circuit of FIG. 1, reference will also be made to FIGS. 3a, 3b and 3c.

In order that as many as possible of the components of the circuit shown in FIG. 1 may be provided in integrated circuit form, the operation of the circuit is digital. Thus the waveforms of sinusoidal and co-sinusoidal nature applied to the light sources 3 and 4 are digital, square waveforms of the kind shown in part in FIG. 3a. The mark-to-space ratio of adjacent positive and negative going portions of the square waveform shown in FIG. 3a is varied throughout the cycle in a sinusoidal manner. Waveforms for the kind shown in FIG. 3a are known to suffer little from odd harmonic distortion. A similar waveform of identical frequency but of co-sinusoidal nature is also generated. The frequency of these waveforms could be typically 800 Hz.

The controlling logic circuit 12 is arranged to produce a control waveform of the kind shown in FIG. 3b to control the changing of switch 6. Thus in every odd period (say) of the control waveform, the switch 6 is effective to couple the waveform of sinusoidal nature to the light source 4 so that, during these periods, both sources 3 and 4 are producing light in accordance with the waveform of sinusoidal nature. In every even period of the control waveform, the switch 6 is effective to couple the waveform of co-sinusoidal nature to the source 4. It will therefore be appreciated that, in alternative periods of the control waveform, the conditions indicated in FIGS. 2a and 2b respectively obtain. As previously mentioned, the horizontal scale used in FIG. 3b is substantially different from that used in FIG. 3a. In practice, each half cycle of the control waveform shown in FIG. 3b contains several complete cycles of the waveform shown in FIG. 3a.

The switching action of switch 6 tends to introduce transient oscillations into the light output from source 4 and so the control circuit 12 is arranged to render the counting circuit 9 insensitive for a period corresponding to a few cycles of the digital sine wave after each change of switch 6. After this period, the counting circuit 9 is rendered effective to increment or decrement by means of the switch 11 which is operated by a waveform, generated in circuit 12, of the kind shown in FIG. 3c. It will be appreciated that the counting circuit 9 increments and decrements during alternate sampling periods. The counting operation of circuit 9 is stopped each time a positive going pulse is passed by the threshold circuit 8.

The effect is thus, for example, that during odd periods of the control waveform, the counter increments and during the even periods the counter decrements. The difference remaining in the counter after two adjacent periods is thus an indication of the true phase of the vector A5, the error having been removed by the operation of the circuit.

The circuit, in addition to compensating for phase errors such as $\epsilon$, is stable with temperature since the temperature drifts in, say, the threshold circuit 8 are negligible because in this design the threshold error component in the increment count is equally counterbalanced by the corresponding error in the decrement. This will remain true for all rates of variation or shifts in the threshold which are small compared with the timing of waveform 3b, say 10 milliseconds total.

The invention is not limited to the use of a member such as 1 in combination with lamps such as 3 and 4 and a detector 5. For example the member 1 could be replaced by a ferrite coupling member adapted to provide variable coupling between a pair of input coils which replace the sources 3 and 4 and an output coil which replaces the detector 5.

In a modification of the arrangement shown in FIG. 1, the two lamps 3 and 4 are produced as an integrated lamp assembly, in which two adjacent light emitting junctions are diffused in a single substrate or die made from a semiconductor such as gallium arsenide. The geometries of the junctions are arranged as shown in FIGS. 4a and 4b such that when the slit 2 of the member 1 is in the normal working range, a defined proportion of reference and quadrature light depending upon the exact position of the slit 2 is viewed by the photo detector 5. Further the predetermined junction geometries produce a rotating vector in the photo detector 5 when the slit traverses the two light emitting junctions. The adjacent junction geometries, and hence linearity, of the system can readily be altered to accommodate either straight line or simple monotonic angular rotation of the resultant vector with respect to slit displacement. This feature can help reduce further digital function generation in the subsequent logic.

The overall arrangement can tolerate fairly wide variations in amplitude of the resulting vector, and thus no particular attention is required to ensure that the light levels from the reference and quadrature lamps are properly adjusted with respect to the photo receiver. All that is required is that the adjacent geometries are in the correct proportion.

Further advantages of an integrated lamp pair are that both junctions are relatively similar and greater displacements can be achieved compared with the use of two individual lamps.

A practical form of circuit for components 5 to 8 of the FIG. 1 arrangement is shown in FIG. 5. The photo detector 5 (FIG. 1) comprises a photo-transistor $VT_1$, which can also take the form of a Darlington assembly. The transistor $VT_1$ receives the vector component of the digital sine and cosine waveforms via the slit 2 (FIG. 1). The main object of the photodetector and filter stage is to provide at its output a reasonably linear, sinusoidal waveform having an acceptably low harmonic content and reasonably free from the effects of drift due to temperature.

A potentiometer comprises resistors $R_3$ and $R_4$ is arranged to provide the D.C. reference input for both the photo transistor $VT_1$ and the subsequent squaring stage and in the particular application being described, resistors $R_3$ and $R_4$ where chosen to be equal — giving a reference equal to half the supply voltage.

A resistor $R_2$, and a pair of capacitors $C_1$ and $C_2$, together with $R_3$ and $R_4$, form a particular type of low pass active filter giving a bandpass response and deriving its input from the photo current in the photo transistor $VT_1$. In common with the more conventional forms of active filters, the values of the passive elements can be calculated to give an optimum compromise between overshoot, settling time and attenuation.

Returning to the potentiometer $R_3$ and $R_4$ it can be seen that its common point is also the output of the first stage — this is because the emitter output, for all practical purposes, effectively couples the mid point of this chain at the vector frequency by means of the capacitor $C_2$, and this eliminates thermal drift errors which occur at the emitter. A further low pass filter stage in the form of a resistor $R_5$ and a capacitor $C_3$ completes the filter and the output is then the required vector (phase shifted by the characteristics of the filters) having very little harmonic distortion. For example in a practical design having an 800 Hz centre frequency, a settling error at the measurement point of 0.5% maximum was obtained with −20db attenuation at the third harmonic, and having thereafter an attenuation slope of 12db per octave.

The remaining circuit including transistors $VT_2$, $VT_3$ and $VT_4$ etc., is a squaring stage which squares the sine wave superimposed on the centre supply reference voltage. It can be seen that the feedback DC gain of the stage is unity, due to the connection of resistor $R_8$ from the output to the base of $VT_3$, it follows then that the average value of the output, because of the low frequency filter consisting of $R_8$ and a capacitor $C_4$ is equal to the DC input to the base of $VT_2$, i.e. half the supply voltage. The gain of the squarer is such that $VT_4$ alternately saturates and cuts off, resulting in a voltage excursion nearly equal to the supply voltage and a square wave of this amplitude having an average value equal to half itself, i.e. the supply voltage has a mark to space ratio of 1:1. The subsequent digital counter vector recovery logic can tolerate much greater errors than are produced by the photodetector, filter and squarer just described as regards amplitude, transient, phase and temperature changes.

An alternative method of converting the measurement vector, which represents the movement being measured, into a digital number stored in the counter 9 (FIG. 1) will now be described, references being made to the waveform shown in FIG. 6 in which, FIG. 6a represents the phase of the reference sine wave fed to the light emitting diode 3 (FIG. 1).

FIG. 6b represents the phase of the filtered signal during the periods when the cosinusoidal waveform is applied to lamp 4 and represents the phase of the error vector plus the required measurement vector.

The frequency of the clock pulses fed to the counter 9 is sufficient to "fill" it in the period marked x in FIG. 6a. The counter then reads zero again. Thus if pulses were counted for the period 2x, the counter would be "filled" twice and would read zero once more.

FIG. 6d represents the phase difference between the waveforms of FIGS. 6a and 6b. If this signal was used to gate pulses to the counter, the count stored would represent the error vector.

FIG. 6e represents the phase difference between the waveforms of FIGS. 6a and 6c. If this signal was used to gate pulses to the counter, the count stored would represent the error vector plus the required measurement vector. If from this, the count obtained from waveform 6d were subtracted, the remaining count would represent the required measurement vector.

Alternatively, however, the waveform shown in FIG. 6f, which represents the complement of waveform 6d can be used. If this signal is used to gate pulses to the counter, the count stored is short of full by a count equivalent to the error vector count of waveform 6d. If the count equivalent to waveform 6e is now added the remaining count will again represent the measurement vector required.

Similarly if a count proportional to the complement of the waveform 6c is added to a count proportional to the waveform 6d, the remaining count will again represent the measurement vector required.

The member 1 can be modified as follows to give an increased range of operation.

FIG. 7 shows the existing displacement member and slot midway between the centres of the reference and quadrature lamps (3 and 4 — FIG. 1), the centres being shown in FIG. 7 as shown at A and B respectively. The range of travel of the aperture is indicated by $d$ which corresponds to the centre to centre spacing of the two lamps, and in one particular design $d$ is approximately 60 thousandths of an inch.

If it is desired to keep the same design for the lamp assembly, but it is required to accommodate a travel greater than $d$, the mechanical alteration as shown in FIG. 8 can be used. FIG. 8 shows the displacement member 1 with the slot 2 of the same width as before, but inclined at an angle $\theta$ with respect to the direction of travel.

The centre to centre distance $d$ remains the same as in the original design shown in FIG. 7 but we now require a travel
 $t = d/\sin \theta$ to traverse the distance $d$.

Effective linear magnification of four times has proved feasible and this method has also proved useful in scaling $d$ to any peak displacement in the design range.

What I claim is:

1. An apparatus for providing an electrical signal which is indicative of the disposition of a member, said system comprising:
    first and second means for radiating electromagnetic energy in accordance with respective input signals applied thereto;
    third means for receiving the energy from said first and second means in variable proportions in accordance with the disposition of the member and for producing an electrical output signal indicative of the phase of said received energy;
    control means for applying said input signals to said first and second means so as to cause said first and second means to concurrently radiate energy of substantially the same frequency characteristics, but with first and second phase relationships with respect to each other during respective first and second time periods, with said first phase relationship being such that the phase of said received energy varies in accordance with the relative proportions of energy received from said first and second means, and with said second phase relationship being such that the phase of said received energy is substantially independent of the relative proportions of energy received from said first and second means; and means for responding to the phase of the output signals from said third means so as to produce a phase measurement signal which is indicative of the difference between the phase of the output signals during said first and second time periods;

whereby said phase measurement signal is indicative of the disposition of said member.

2. The apparatus of claim 1 wherein said means for producing a phase measurement signal comprises a counter responsive to the output signals from said third means and operative to provide a count indicative of the phase of said output signal, and means for causing said counter to increment and decrement the count held therein during said first and second time periods, respectively.

3. The apparatus of claim 1 wherein said control means includes means for applying the input signals to said first and second means such that said second phase relationship is an in-phase relationship.

4. The apparatus of claim 3 wherein said control means includes means for applying the input signals to said first and second means such that said first phase relationship is a quadrature phase relationship.

5. The apparatus of claim 1 wherein said first and second means comprise first and second light emitting diodes, respectively.

6. The apparatus of claim 1 wherein said control means includes means for applying said respective input signals in the form of periodic pulse trains width-modulated in accordance with a sine waveform.

7. The apparatus of claim 1 wherein said member is movable relative to said first and second means and is arranged to move in response to variations of a parameter to be measured; said member includes a slit through which the electromagnetic energy radiated by said first and second means can be transmitted to said third means; and wherein said slit is disposed at an acute angle to the direction of motion of said member.

8. A system for providing an electrical signal indicative of the value of a select parameter, said system comprising:

first and second light emitting diodes;

a member adapted for being positioned along a first axis in response to the value of said selected parameter, said member including a slit through which light emitted by said diodes is transmitted;

sensing means for receiving the light transmitted through said slit and for producing an electrical output signal indicative of the phase of said received light signals;

control means for applying first and second activation signals to first and second light emitting diodes, respectively, said activation signals being of substantially the same frequency and with a quadrature phase relationship with respect to one another during a first time period and with an in-phase phase relationship during a second time period; and means for responding to the phase of the output signals from said sensing means so as to produce a phase measurement signal which is a function of the difference between the phase of the output signals during the first and second time periods;

whereby said phase measurement signal is indicative of the value of said selected parameter.

9. The system of claim 8 wherein said means for producing said phase measurement signal comprises a counter responsive to the output signals from said sensing means and operative to provide a count indicative of the phase of the output signal and means for causing said counter to increment and decrement the count held therein during said first and second time periods, respectively.

10. The system of claim 8 wherein said sensing means includes means for processing the signal indicative of the phase of said received light so as to reduce distortions thereof.

11. The system of claim 8 wherein said control means includes means for applying the input signals to said first and second diodes in the form of periodic pulse trains width-modulated in accordance with a sine wave.

* * * * *